Dec. 7, 1965     G. A. DU ROCHER     3,222,584

MOTOR REVERSING CIRCUIT

Filed May 14, 1962

INVENTOR.
GIDEON A. DUROCHER
BY
Robert D. Sommer

AGENT

United States Patent Office 3,222,584
Patented Dec. 7, 1965

3,222,584
MOTOR REVERSING CIRCUIT
Gideon A. Du Rocher, Mount Clemens, Mich., assignor to Essex Wire Corporation, Fort Wayne, Ind., a corporation of Michigan
Filed May 14, 1962, Ser. No. 194,352
4 Claims. (Cl. 318—293)

This invention relates to motor reversing circuits and, more particularly, to a circuit for reversing electric D.C. motors of the permanent magnet field type.

In modern automotive vehicles, small reversible D.C. electric motors are employed for a variety of purposes such as operating adjustable seats, windows, radio antennae and the like. In such applications, the motor operates in one direction upon the closing of one control switch and operates in the opposite direction upon the closing of another switch. These motors have been generally of the split series or split shunt field type because the control circuitry for these types of reversible motors is simple. The permanent magnet D.C. motor, despite its cost advantage over the split field type motors, has not been used to any appreciable extent for automotive applications because the reversing of this type of motor has been thought to require rather complicated circuitry. As reversal of this motor can be effected only by reversing the direction of current flow in the motor armature, it has been considered necessary to use double pole, double throw switch circuitry. In some applications of reversible motors such as for operation of adjustable seats, the control circuitry becomes even more involved because the switching means for the motor is operated by a single control member movable in four directions corresponding to the directions in which the seat is movable. In addition, the switching means must also selectively control two solenoids used for control of the mechanical mechanism of the adjustable seat, thus requiring a three pole switch operable in four directions with a large number of cross connections between the stationary contacts of the switch. The additional cost involved in such a switch and its associated circuitry over that employed with the conventional split field motor substantially nullifies the savings resulting from the use of the cheaper permanent magnet motor and may even result in an overall increase in cost.

Accordingly, it is the object of this invention to provide a simple and economical control circuit for reversing a D.C. motor of the permanent magnet field type.

Figure 1:
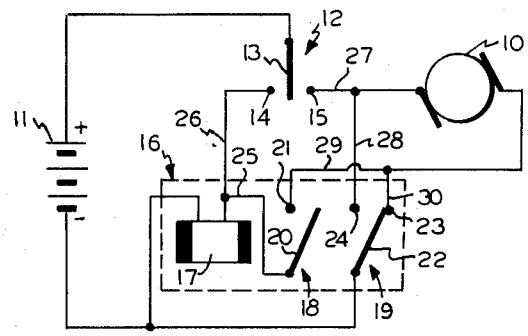
Figure 2:
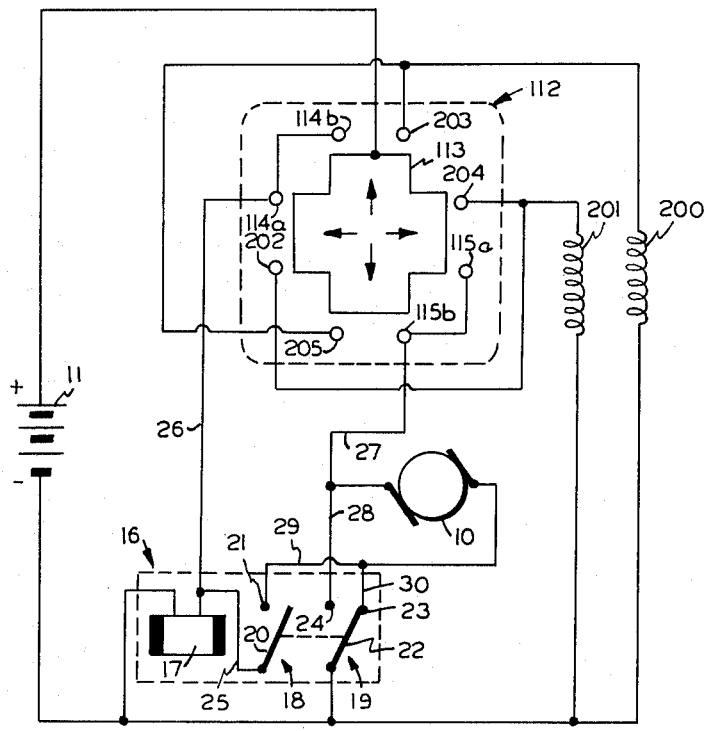

How this and other objects of the invention are attained will be understood from the following description referring to the accompanying drawing in which:

FIGURE 1 is a schematic wiring diagram of the improved motor reversing circuit of this invention; and FIGURE 2 is a schematic wiring diagram of the control circuit of a seat adjusting mechanism.

Referring now to FIGURE 1, reference numeral 10 designates the armature of a reversible permanent magnet D.C. motor of a well known type having a stator with permanent magnet field poles for field excitation. The direction of rotation of this type of motor is dependent solely upon the polarity of voltage supplied to the armature 10 from a unidirectional or D.C. power source such as the battery 11. The means for selectively controlling the polarity of the voltage applied to the armature 10 includes a single pole, double throw control switch 12 which is of the normally open, manually operated type. The switch 12 has a movable contact element or blade 13 and a pair of stationary contacts 14 and 15 which are selectively engageable by the blade 13. The control circuit for the motor also includes a relay 16 which is provided with an operating coil 17, a single pole, single throw normally open switch 18 and a single pole, double throw switch 19. The relay switch 18 has a movable blade 20 engaging a stationary contact 21 when the relay coil 17 is energized. Relay switch 19 has a movable contact element or blade 22 normally engaging a stationary contact 23 but engaging a stationary contact 24 when the relay coil 17 is energized. The positive terminal of the battery 11 is connected directly to the blade 13 of the control switch 12 and the other battery terminal is connected directly to the blade 22 of the relay switch 19 and to one side of the relay coil 17. The other side of the coil 17 is connected by the line 25 to the blade 20 of the relay switch 18 and by the line 26 to the stationary contact 14 of the control switch 12. One side of the motor armature 10 is connected by the line 27 to the other stationary contact 15 of the control switch 12 and by the line 28 to the relay contact 24. The other side of the motor armature 10 is connected by the line 29 to the relay contact 21 and by the line 30 to the relay contact 23.

In the operation of the circuit of FIGURE 1, the blade 13 of the control switch 12 is moved to engage the contact 15 when it is desired to operate the motor in one direction. This completes an energizing circuit to the motor armature 10 as follows: from the positive battery terminal, switch blade 13, contact 15, line 27, armature 10, line 30, relay contact 23, and blade 22 to the negative battery terminal. Thus, a positive potential is applied to the left hand side of the motor armature 10 and the armature 10 will remain energized as long as the blade 13 of the control switch 12 remains in engagement with the contact 15.

When it is desired to reverse the direction of operation of the motor armature 10, the blade 13 of the control switch 12 is moved to engage the contact 14. This immediately completes a circuit to the relay coil as follows: from the positive battery terminal, switch blade 13, contact 14, line 26, and coil 17 to the negative battery terminal. In this position of the control switch 12, the motor armature 10 is not initially connected to the battery 11 but, as soon as the relay switches 18 and 19 are operated by the coil 17, a circuit is completed to the motor armature 10 as follows: from the positive battery terminal, switch blade 13, contact 14, line 26, line 25, relay blade 20, contact 21, line 29, motor armature 10, line 28, relay contact 24, blade 22 to the negative terminal of the battery 11. It will be noted that a negative potential is now applied to the left hand side of the motor armature 10, causing the motor to operate in a direction opposite to that occurring when the control switch 12 is in its other closed position. Upon the return of the switch blade 13 to its normally open position, both the relay coil 17 and the motor armature are immediately deenergized.

Referring now to FIGURE 2, the above described reversing circuit is included as part of a control circuit for a four-way seat adjusting system. Similar reference characters have been applied to similar parts shown in FIGURES 1 and 2 except for the modified form of the control switch and its parts shown in FIGURE 2 which have been designated by similar reference characters preceded by the numeral "1."

The control circuit shown in FIGURE 2 is particularly adapted for the control of a well known type of four-way seat operating mechanism which is adjustable in horizontal and vertical directions. In such mechanism, a first solenoid 200 controls the vertical movements of the seat and must be energized to permit the seat adjusting motor to raise or lower the seat. Similarly, a second solenoid 201 controls the horizontal movements of the seat and must be energized to permit the seat adjusting motor to shift the seat forward or backward. To simplify the operation of the seat, it is desirable to employ a single control switch 112 having a single control member for simultaneously energizing the required motor and solenoid circuits by a movement of the switch control member in the same direction as it is desired to effect movement of the seat. One known type of control switch 112 comprises a contact plate or element 113 of cruciform shape and movable by a control member from a normally open, neutral position in any of four directions as indicated by the arrows shown in FIGURE 2 toward any one of the pairs of stationary contacts 114a–202, 114b–203, 115a–204 and 115b–205. The stationary contacts 114a and 114b are both connected to the line 26 and correspond to the contact 14 of the control switch 12 in FIGURE 1 while the stationary contacts 115a and 115b are both connected to the line 27 and correspond to the stationary contact 15 of the control switch 12 of FIGURE 1. Similarly, the movable contact plate 113 is connected to the battery 11 and corresponds to the blade 13 of the switch 12 in FIGURE 1. Contacts 202 and 204 are connected to one side of the solenoid 201 and contacts 203 and 205 are connected to one side of the solenoid 200. The other sides of solenoids 200 and 201 are connected to the negative terminal of the battery 11.

The operation of the circuit shown in FIGURE 2 is identical with that described in connection with FIGURE 1, except that the motor armature 10 will be energized with one polarity when the contact plate 113 engages either switch contact 114a or 114b and will be energized with the opposite polarity when the contact plate 113 engages either switch contact 115a or 115b. In addition, one of the solenoids 200 and 201 will be energized in each operating position of the contact plate 113. As will be apparent, therefore, moving the contact plate 113 upwardly energizes the motor armature 10 to operate in one direction and energizes the vertical solenoid 200 while moving the contact plate 113 to left energizes the motor armature 10 to operate in the same direction and energizes the horizontal solenoid 201. By operating the contact plate 113 in the opposite directions, the solenoids are respectively energized in the same way and the motor armature 10 is energized to operate in the opposite direction.

While particular embodiments of the invention have been shown and described, modifications thereof may be made and it is intended to cover all such modifications as fall within the scope of the invention as claimed.

What is claimed is:

1. A reversing circuit for a reversible D.C. motor adapted to be energized from a unidirectional power source and having an armature through which current may pass in opposite directions to reverse the direction of rotation of the motor, said reversing circuit comprising, in combination with said motor and power source:
   (a) a control switch having movable contact means connected to one side of the power source, and first and second contacts selectively engaged by the movable contact means;
   (b) a relay having an operating coil, a first pair of normally open contacts, a second pair of normally open contacts and a third pair of normally closed contacts, said pairs of normally open contacts being closed and said pair of normally closed contacts being opened when said coil is energized;
   (c) first conductor means connecting the relay coil between the first control switch contact and the other side of the power source;
   (d) second conductor means connecting one side of the motor armature to the second control switch contact;
   (e) third conductor means connecting the first pair of normally open relay contacts between said one side of the motor armature and said other side of the power source;
   (f) fourth conductor means connecting the second pair of normally open relay contacts between the first control switch contact and the other side of the motor armature;
   (g) fifth conductor means connecting the third pair of normally closed relay contacts between said other side of the motor armature and said other side of the power source;
   (h) the control switch when the movable contact means engages the control switch second contact and the third pair of normally closed relay contacts comprising a first armature energizing circuit for causing current flow through the armature in a certain direction; and
   (i) the control switch when the movable contact means engages the control switch first contact and the first and second pairs of normally open relay contacts when closed comprising a second armature energizing circuit for causing current flow through the armature in a reversed direction.

2. A reversing circuit for a reversible D.C. motor adapted to be energized from a unidirectional power source, said motor having permanent magnet field excitation and an armature through which current may pass in opposite directions to reverse the direction of rotation of said motor, said reversing circuit comprising, in combination with said motor and said power source:
   (a) a normally open control switch having movable contact means connected to one side of the power source, and first and second contacts selectively engaged by the movable contact means;
   (b) a relay having an operating coil, a first normally open switch, a second normally open switch and a third normally closed switch, said normally open relay switches being closed and said normally closed relay switch being opened when said coil is energized;
   (c) first conductor means connecting the relay coil between the first control switch contact and the other side of the power source;
   (d) second conductor means connecting one side of the motor armature to the second control switch contact;
   (e) third conductor means connecting the first normally open relay switch between said one side of the motor armature and said other side of the power source;
   (f) fourth conductor means connecting the second normally open relay switch between the first control switch contact and the other side of the motor armature;
   (g) fifth conductor means connecting the third normally closed relay switch between said other side of the motor armature and said other side of the power source;
   (h) the control switch when the movable contact means engages the second contact and the third normally closed relay switch comprising a first armature energizing circuit for causing current flow through the armature in a certain direction; and
   (i) the control switch when the movable contact means engages the first contact and the first and second normally open relay switches when closed comprising a second armature energizing circuit for causing current flow through the armature in a reversed direction.

3. A reversing circuit for a reversible D.C. motor adapted to be energized from a unidirectional power source, said motor having permanent magnet field excitation and an armature through which current may pass in opposite directions to reverse the direction of rotation of said motor, said reversing circuit comprising:
   (a) a normally open control switch having a movable contact element connected to one side of said source, and first and second contacts selectively engaged by said movable contact element;

(b) a relay having an operating coil, a single pole, double throw switch, and a normally open single pole switch, said single pole, double throw relay switch comprising first and second relay contacts and a movable relay contact element which engages said first or second relay contact depending upon whether said relay coil is deenergized or energized;

(c) first circuit means connecting said relay coil between said first control switch contact and the other side of said power source;

(d) second circuit means including said normally open relay switch connecting said motor armature between said first control switch contact and said second relay contact;

(e) third circuit means connecting said motor armature between said second control switch contact and said first relay contact; and (f) fourth circuit means connecting said relay contact element to said other side of the power source.

4. A reversing circuit for a reversible D.C. motor adapted to be energized from a unidirectional power source, said motor having permanent magnet field excitation and an armature through which current may pass in opposite directions to reverse the direction of rotation of said motor, said reversing circuit comprising:

(a) a normally open control switch having a movable contact element connected to one side of said power source, and first and second contacts selectively engaged by said movable contact element;

(b) a relay having an operating coil, a single pole, double throw switch, and a normally open single pole switch, said single pole, double throw relay switch comprising first and second relay contacts and a movable relay contact element which engages said first or second relay contact depending upon whether said relay coil is deenergized or energized;

(c) first circuit means connecting said relay coil between said first control switch contact and the other side of said power source;

(d) second circuit means connecting said relay contact element to said other side of the power source;

(e) third circuit means connecting said normally open relay switch between said first control switch contact and said first relay switch contact;

(f) fourth circuit means connecting one side of said motor armature to the junction between said normally open relay switch and said first relay contact; and (g) fifth circuit means connecting said second control switch contact and said second relay contact to each other and to the other side of said motor armature.

References Cited by the Examiner
UNITED STATES PATENTS

| | | | |
|---|---|---|---|
| 2,651,747 | 9/1953 | Warner | 318—280 X |
| 2,827,105 | 3/1958 | Brundage | 318—9 |
| 2,912,632 | 11/1959 | Turtil | 318—293 |
| 2,981,869 | 4/1961 | Balint | 317—137 |
| 3,064,172 | 11/1962 | Young et al. | 318—293 |

ORIS L. RADER, *Primary Examiner.*